United States Patent Office 3,499,863
Patented Mar. 10, 1970

3,499,863
AIR-CURABLE POLYSULFIDE-POLYURETHANE SEALANTS
Edward Francis Kutch, Trenton, N.J., assignor to Thiokol Chemical Corporation, Bristol, Pa., a corporation of Delaware
No Drawing. Continuation-in-part of application Ser. No. 310,925, Sept. 23, 1963. This application Apr. 21, 1967, Ser. No. 632,541
Int. Cl. C08k 1/36
U.S. Cl. 260—31.6    15 Claims

ABSTRACT OF THE DISCLOSURE

There are disclosed herein air-curable polysulfide-polyurethane sealant and coating compositions based on isocyanate-terminated polysulfide prepolymers of the structure

[1]   $OCN-[R-NH-\underset{\underset{O}{\|}}{C}-O-R'SS-(R''SS)_n-R'-O-\underset{\underset{O}{\|}}{C}-NH]_m-R-NCO$ wherein R is selected from alkylene and arylene radicals, R' and R" are the same bivalent aliphatic radical wherein the carbon atom chain may be interrupted with oxygen atoms, $n$ has an integral value from 1 to 100, and $m$ has an integral value of at least 2, and preferably from 2 to 15, which prepolymers are admixed with inert materials such as fillers, plasticizers, internal lubricants and pigments to form compositions curable by ordinary atmospheric moisture they can be packaged and stored in single containers. The prepolymers can be prepared by reacting a polysulfide polymer of the structure $HO-R'SS-(R''SS)_n-R'-OH$ with a polyisocyante in amounts such that the ratio of isocyanate groups to hydroxyl groups, NCO:OH, is in the range 1.0:1 to 2.0:1.

---

This application is a continuation-in-part of copending application Ser. No. 310,925 filed Sept. 23, 1963 and now abandoned.

This invention relates to novel sealant and coating compositions, and more particularly, to such compositions based on isocyanate-terminated polysulfide prepolymers.

Sealant and coating compositions containing commercially available mercaptan-terminated polysulfide liquid polymers and various curing agents, fillers and plasticizers are known. However, in view of the nature of the curing agents for such polymers, it has not so far been possible to compound sealant and coating compositions based on liquid polysulfide polymers into air-curable, single-package, storage-stable, commercially acceptable products. Furthermore, compositions comprised essentially of isocyanate-terminated polysulfide prepolymers, prepared by reacting diisocyanates with mercaptan-terminated polysulfides, are unstable since such prepolymers are cured by traces of moisture unavoidably present during preparation, packaging and storage.

Accordingly, an object of the present invention is to provide stable, storable sealant and coating compositions based on isocyanate-terminated polysulfide prepolymers. Another object of the present invention is to provide one-package sealant and coating compositions which are curable at room temperature by atmospheric moisture without curing agents or catalysts. Other objects of the invention will be in part pointed out and in part apparent hereinafter.

The sealant and coating compositions of the invention contain as their active ingredient polysulfide prepolymers which are presently believed to have the following general formula:

[1]   $OCN-[R-NH-\underset{\underset{O}{\|}}{C}-O-R'SS-(R''SS)_n-R'-O-\underset{\underset{O}{\|}}{C}-NH]_m-R-NCO$ wherein R is selected from alkylene and arylene radicals, R' and R" are the same bivalent aliphatic radical wherein the carbon atom chain may be interrupted with oxygen atoms, $n$ has an integral value from 1 to 100, and $m$ has an integral value of at least 2, and preferably from 2 to 15.

Broadly speaking, these prepolymers can be prepared by reacting at least one hydroxyl-containing polysulfide polymer with at least one polyisocyanate. More particularly, it has unexpectedly been found that suitable isocyanate-terminated polysulfide prepolymers are those prepared from materials, such as the above-mentioned polysulfide polymers and polyisocyanates, wherein the proportions of reactants are such that the ratio of isocyanate groups to hydroxyl groups, NCO:OH, is in the range of 1.0 to 2.0, preferably between 1.25 and 1.75.

Sealant and coating compositions containing prepolymers so prepared have the particularly desirable properties of being air-curable by atmospheric moisture at room temperature with or without catalysts or curing agents over practical periods of time. Furthermore, the fact that the compositions of the invention form a "one-package system," that is the compositions can be compounded and packaged in a single container, provides a number of important advantages. Specifically, such advantages include eliminating the need to package the various ingredients of the compositions in more than one container and having to blend separate components at a job-site prior to application, and the obvious savings in cost associated with packaging, shipping, storing and selling multiple packages. It should, however, be understood that various ingredients can be added to the compositions after initial packaging, e.g., immediately prior to use, if desired.

The hydroxyl-containing polysulfide polymers used in a preferred embodiment of the invention to prepare the prepolymers may be represented by the structure

[2]   $HO-R'SS-(R''SS)_n-R'-OH$ wherein R' and R" are the same bivalent aliphatic radicals which may be interrupted in the carbon chain by oxygen atoms, and $n$ has an integral value of from 1 to 100. Such preferred prepolymers have a molecular weight of about 500 to 9000, preferably about 2000. The aliphatic radicals which form the backbone of the polysulfide polymer, represented by R' and R", comprise a wide variety of organic radicals. Some examples of such radicals, including radicals which have oxygen atoms or carbonyl groups in the hydrocarbon chain, are $-(CH_2)_y-$, wherein $y$ has an integral value of from 1 to about 10, $-CH(CH_3)CH_2-$, $-CH(CH_3)CH(CH_3)-$,
$CH(C_2H_5)CH_2CH(C_2H_5)-$, $-CH_2CH(CH_3)CH_2-$,
$-CH_2OCH_2-$, $-C_2H_4OC_2H_4-$,
$-C_2H_4OC_2H_4OC_2H_4-$,
$-CH_2OCH_2C(CH_3)_2CH_2OCH_2-$,
$-C_3H_6OCH_2OCH_2OC_3H_6-$, $-CH_2OCH_2C(O)CH_2-$
$-C_2H_4OC(O)OC_2H_4-$, $-CH(CH_3)OCH(CH_3)-$
$-CH(OCH_3)CH_2OC_2H_4OC_2H_4OCH_2CH(OCH_3)-$
$-CH(C_3H_7)OCH(C_3H_7)-$, $-C_4H_8OC_4H_8-$
$-CH_2C(O)OC_3H_6OC(O)CH_2-$ $-C_2H_4C(O)O(C_2H_4O)_yC(O)C_2H_4-$, wherein $y$ has an integral value from 1 to about 10, $-CH_2CH=CHCH_2-$, $-CH_2CH=CHC_2H_4-$, $-CH_2CH=CHC_3H_6-$
$-C_2H_4CH=CHC_3H_6-$, $CH_2CH=CHCH(CH_3)-$
and $-C_2H_4CH=CHCH_2CH(CH_3)-$.

In the commercially important polymers, the total number of carbon and oxygen atoms in the radicals between the disulfide groups normally ranges from 2 to 10.

The hydroxyl-containing polysulfide polymers used to prepare the isocyanate-terminated prepolymers of the invention can be prepared by a one-step process wherein a dihalo-organic compound such as $ClR''—Cl$, a chlorohydrin such as $Cl—R'—OH$, and an inorganic polysulfide are reacted. Examples of the groups represented by R' and R'' have previously been described. Chlorine is the preferred halogen group and sodium disulfide is the preferred inorganic polysulfide. Accordingly, the reaction may be illustrated by the following equation:

[3] $nClR''Cl+(n+1)Na_2S_2+2ClR'OH \rightarrow$
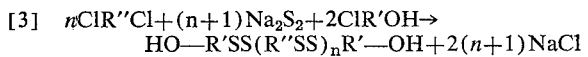
$HO—R'SS(R''SS)_nR'—OH+2(n+1)NaCl$ Particularly suitable hydroxyl-containing polymers are those in which R' and R'' are polymethylene radicals, such as $(CH_2)_y$ wherein $y$ has an integral value of 1 to 10, and polymethylene mono- and polyether radicals such as $—C_2H_4—O—C_2H_4—$ and

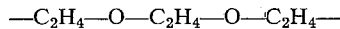
$—C_2H_4—O—C_2H_4—O—C_2H_4—$

The integral value of $n$, from 1 to 100, is such that the hydroxyl-containing polymer has a molecular weight of about 500 to 9000. Moreover, crosslinking agents such as 1,2,3-trichloropropane can be used to impart a limited degree of crosslinking, in the order of up to about 2% as desired, to improve particular properties of the ultimate isocyanate-terminated prepolymer. The two step preparation of these polymers is described in U.S. Patent No. 2,789,958, to Fettes and Gannon.

A wide variety of polyisocyanates can suitable be reacted with the above-described hydroxyl-containing polymers to prepare the isocyanate-terminated polysulfide prepolymers of the invention. Generally, any of the organic polyisocyanates that have previously been proposed for the preparation of polyurethane resins may be employed in preparing the present products. Suitable polyisocyanates are, for example, arylene polyisocyanates such as tolylene, metaphenylene, 4-chlorophenylene-1,3-, methylene-bis-(phenylene-4-), biphenylene - 4, 4'-, 3,3'-dimethoxy-biphenylene-4',4-, 3,3' - diphenyl - biphenylene-4,4'-, naphthalene-1,5- and tetrahydronaphthalene-1,5-diisocyanates and triphenyl - methane triisocyanate; alkylene polyisocyanates such as ethylene, ethylidene, propylene-1,2-, butylene-1,4-, butylene-1,3-, hexylene-1,6-, decamethylene-1,10-, cyclohexylene-1,2-, cyclohexylene-1,4-, and methylene-bis-(cyclohexyl-4,4'-) - diisocyanates. Toluene diisocyanates, commercially the most widely used diisocyanates, are preferred, especially a mixture of 80% of the 2,4-isomer and 20% of the 2,6-isomer thereof. Inorganic polyisocyanates are also suitable according to the invention.

As previously noted the hydroxyl-containing polysulfide polymers and the polyisocyanate, which are reacted to prepare the isocyanate-terminated polysulfide prepolymer, should be reacted in amounts such that the ratio of isocyanate groups to hydroxyl groups, NCO:OH, is within the range 1.0 to 2.0, preferably 1.25 to 1.75. It has been found that prepolymers prepared from ratios of ingredients not within that range do not, when compounded into coating or sealant compositions, possess the especially desirable properties of the compositions set forth herein.

Sealant and coating compositions of the invention contain, as has already been mentioned, isocyanate-terminated polysulfide prepolymers as the important ingredient. In addition thereto, the compositions normally contain a variety of inert materials, including fillers, plasticizers, internal lubricants and pigments. The inert materials actually incorporated into a given composition may be varied, of course, over a wide range both as to proportion and as to kind.

For example, fillers may be used in amounts advantageously ranging from 15 to 300 parts by weight per 100 parts of the polysulfide prepolymer, 30 to 60 parts being a preferred range. Obviously, there is no restriction on the incorporation of several different fillers into a single composition. The fillers may be acidic or basic in nature, although neutral fillers are desirable. Titanium dioxide and calcium carbonate are the preferred fillers among a variety including zinc sulfide, lithopone, fatty acid coated lithopone, silicon dioxide and triturated mica as well as others known in the art.

Plasticizers such as dibutyl phthalate, polychlorinated phenols, chlorinated biphenyls, orthonitrobiphenyl, mixed isomeric terphenyls, coumarone-indene resins, methyl and ethyl phthalyl glycollates, dibutyl and other acetal formals (so-called gem diethers) and liquid tall oils, may be used alone or in combination. Polychlorinated phenols are particularly suitable plasticizers. The plasticizers may be used in amounts up to about 200, preferably 25 to 75, parts by weight per 100 parts of prepolymer.

Internal lubricants may be used alone or in combination in amounts up to about 5 parts by weight, preferably about 0.1 to 2 parts, per 100 parts of prepolymer. Lubricants include oil-modified alkyd resins and silicon materials, and are particularly desirable for their ability to reduce surface tension in sealant and coating compositions thereby facilitating the escape of carbon dioxide formed during the curing of the composition. It will, of course, be understood that mixtures of different fillers, plasticizers and internal lubricants can be used.

It should be noted, in view of the earlier statements with respect to the fact that the compositions of the invention are curable by moisture from the atmosphere, that it is important that inert materials compounded with the isocyanate-terminated polysulfide prepolymers be as nearly moisture-free as possible. Failure to observe this precaution may reduce the stability of these compositions during preparation, storage and application.

The compositions are curable in the ordinary course without the need of catalysts. However, catalysts may be used, as required for certain applications or as otherwise desired. Catalysts generally recognized to be effective in curing isocyanate-containing prepolymers are suitable. Particularly effective catalysts include hydrous metal halides, such as ferric chloride, and deliquescent salts such as potassium orthophosphate and potassium formate. The catalysts may be used alone or in combination in amounts up to about 1% by weight of the prepolymer, and preferably in the range of 0.1% to 0.5% by weight.

The cured compositions of the invention are tough elastomers which bond firmly to glass, metal, wood and concrete as well as to other structural materials. The curing time of the compositions varies from several hours to several days depending upon the prevailing humidity of the surrounding atmosphere. The cured compositions are uniform in consistency and have a minimum amount of void space. In view of these favorable properties, the compositions are useful in a wide variety of applications as sealants and coatings.

Noteworthy applications of the compositions as sealants are to calk and seal window, floor, door, drain and roof joints, and boat decks and swimming pools. The sealants are particularly suitable since they can be used in thicknesses of one-quarter inch and greater without adversely affecting the bonding strength or consistency of the cured materials, or the curing efficiency of the compositions.

The compositions of the invention are useful as coatings for various materials including concrete, plaster and wood. Particularly satisfactory applications include coating boat decks, swimming pools and weathering surfaces. Coating compositions are compounded in substantially the same proportions of ingredients as are the sealants. Compositions containing about 10% solids and a plasticizer are especially suitable as a penetrating sealant and coating. Inert organic solvents can be added to the compositions as desired for certain applications.

It should be understood that no firm distinction is intended to be drawn in the present application between "sealant" and "coating" compositions since the same composition may at times be used for either or both purposes, for example, a composition used to both seal and coat a boat deck.

The following examples are set forth to point out more fully the nature of the present invention by illustrating specific embodiments thereof and are not intended to limit in any way the scope of the invention. The amount of materials are expressed as parts by weight unless otherwise indicated.

EXAMPLE 1

A mixed feed at 180° F. consisting of 590 lbs. of dichloroethyl formal, 121 lbs. of ethylene chlorohydrin and 14¾ lbs. of 1,2,3-trichloropropane was introduced into a mixture of 236 gallons of sodium polysulfide solution of sulfur rank 2.00, 10 lbs. of a 5% solution of sodium alkylnaphthylenesulfonate and 80 lbs. of a 25% magnesium chloride aqueous solution over a two hour period. The mixture was heated to 200°–215° F. and held in that temperature range for four hours. Analysis of a sample of the hydroxyl-terminated polysulfide polymer thus prepared showed it had a viscosity of 350–450 poises at 80° F., a hydroxyl value of 41, a moisture content of 0.1% and about a 2% crosslinked content.

One hundred parts (2 mols) of the polymer thus prepared and 10 parts of benzene were added to a flask wherein the mixture was slowly agitated. The flask was swept with dry nitrogen and a dry nitrogen atmosphere was maintained throughout the remainder of the process. The mixture was heated to 157° F., its boiling point, and benzene and water were removed by slow azeotropic distillation. After removal of all the benzene and water, the mixture was cooled to 80° F. and 9.53 parts (3 mols) of an 80/20 mixture of 2,4- and 2,6-toluene diisocyanate, respectively, were added to the flask. Under constant agitation, the mixture was heated to 175° F. and held at that temperature for three hours. The mixture was then cooled to 80° F. and packaged in glass jars under nitrogen atmosphere. The isocyanate-terminated polysulfide prepolymer thus prepared from reactants having an NCO/OH ratio of 1.50 had an isocyanate content of 2.14%.

A sealant composition was prepared by mixing and milling the following absolutely dry ingredients in an essentially moisture-free atmosphere; 100 parts of the above propolymer, 40 parts of Titanox AMO (titanium dioxide sold by Titanium Pigment Corp.), 3 parts of Plaskon 6177 (a long oil soybean alkyd resin sold by Allied Chemical Corporation) and 0.2 part of Silicone Resin #103 (a transparent polysilicone resin sold by General Electric Company). The physical properties of the thus prepared sealant composition during curing are shown in Table I.

TABLE I

| Cure time at room temperature (days) | 7 | 14 | 30 |
|---|---|---|---|
| Tensile strength (p.s.i.) | 50 | 265 | 410 |
| Modulus at 200% (p.s.i.) | | 255 | 410 |
| Elongation (percent) | 160 | 210 | 200 |
| Hardness (Shore A) | 30 | 44 | 63 |
| Tack free time (days) | 3 | | |

EXAMPLE 2

Three runs were made to prepare an uncrosslinked hydroxyl-terminated polysulfide polymer. In each run, a mixed feed at 180° F. of 398 mls. of ethylene chlorohydrin and 1270 mls. of dichloroethyl formal was introduced into a mixture of 4120 mls. of sodium sulfide having a sulfur rank of 2.24, 1640 mls. of sodium sulfide having a sulfur rank of 1.35, 30 mls. of a 5% solution of sodium alkylnaphthylenesulfonate and 210 mls. of a 25% magnesium chloride aqueous solution. The mixture was heated to and maintained at 200°–215° F. for 11 hours after which it was cooled, coagulated with acetic acid, washed with water and dried. The reaction products of the three runs were combined to yield 4140 gms. of a liquid polymer having a viscosity of 105 poises at 80° F. and a hydroxyl value of 53.47. The polymer contained 40.36% sulfur, 0.013% chlorine, 0.12% mercaptan and 0.33% water.

A 3-liter resin pot equipped with an agitator, thermometer, nitrogen inlet and reflux condenser topped with an inverted funnel was charged with 1500 gms. of the liquid polymer prepared above and was heated to 145° F. Three drops of orthochlorobenzoyl chloride were added and 190 gms. of toluene diisocyanate were added immediately thereafter. The mixture was heated to 200° F. in one-half hour and maintained at that temperature for two hours. The reaction mixture was then cooled to 175° F. and discharged into jars. Analysis showed the prepolymer product thus obtained from reactants having an NCO/OH ratio of 1.5 contained 1.41% NCO and had a viscosity of 15,440 poises at 80° F.

A sealant composition was prepared as described in Example 1 from 100 parts of the prepolymer thus prepared, 50 parts of Titanox RA–50 (a white pigment marketed by Titanium Pigment Corp.) and 50 parts of Aroclor 1232 (a chlorinated biphenyl containing 32% chlorine). The sealant was applied to and cured in aluminum channels 0.25 by 0.5 by 2.0 inches under various conditions, and the number of days required to achieve various stages of cure are indicated in Table II below.

TABLE II

| Conditions | Tack free time | Thick skin time | Cure through time |
|---|---|---|---|
| Low humidity indoors | 2 | 5 | 8 |
| Medium humidity indoors | 1 | 1 | 2 |
| High humidity indoors | 1 | 1 | 2 |
| Outdoors | 2 | 3 | 5 |

EXAMPLE 3

An uncrosslinked hydroxyl-terminated polysulfide polymer was prepared in each of three runs wherein 398 mls. of ethylene chlorohydrin and 1270 mls. of dichloroethyl formal, as a mixed feed at 180° F., were fed into a mixture of 4000 mls. of sulfur rank 2.27 sodium sulfide, 1541 mls. of sulfur rank 1.35 sodium sulfide, 29 gms. of sodium mercaptan, 30 mls. of a 5% solution of sodium alkylnaphthylenesulfonate and 210 mls. of a 25% aqueous solution of magnesium chloride over a one hour interval. The temperature of the mixture then was raised to 190° F. and held for one hour, raised to 200° F. and held for one hour, and then raised to 210° F. and held for ten hours. Thereafter, the reaction mixture was cooled, coagulated with acetic acid, washed with water and dried. The reaction products of each run were combined yielding a total of 4487 gms. of a liquid polymer having a viscosity of 120 poises and a hydroxyl value of 53.47. The product contained 41.35% sulfur, 0.081% chlorine, 0.075% mercaptan and 0.20% water.

A 3-liter resin pot equipped as described in Example 2 was charged with 1500 gms. of the liquid polymer described above and heated to 145° F. Three drops of orthochlorobenzoyl chloride were added immediately followed by 158 gms. of toluene diisocyanate. The mixture was heated to 200° F. in 30 minutes and held at that temperature for two hours. Thereafter, with constant agitation, 552 gms. of Aroclor 1232 were added to the reaction mixture, and the mixture was discharged from the resin pot into jars. The jars were placed in an oven set at 158° F. and the mixture was allowed to dry. The isocyanate-terminated polysulfide prepolymer, prepared from reactants having an NCO/OH ratio of 1.25, had an NCO content of 0.71% and a viscosity of 3120 poises at 180° F.

Two sealant compositions were prepared as described in Example 1, each containing 100 parts of the prepolymer and 50 parts of Titanox RA–50, one of the sealants also containing 50 parts of Aroclor 1232. Each sealant was applied to and cured in aluminum channels 0.25 by 0.5 by 2.0 inches under a variety of conditions. The sealant composition without Aroclor is designated "A" and the composition containing Aroclor is designated "B." The time in days required to achieve different stages of cure is indicated in Table III below.

TABLE III

| Conditions | Tack free time | | Thick skin time | | Cure through time | |
|---|---|---|---|---|---|---|
|  | A | B | A | B | A | B |
| Low humidity indoors | 1 | 4 | 1 | 7 | 4 | 18 |
| Medium humidity indoors | 1 | 2 | 1 | 4 | 4 | 8 |
| High humidity indoors | 1 | 1 | 1 | 2 | 2 | 4 |
| Outdoors | 1 | 1 | 1 | 4 | 4 | 18 |

The physical properties of the two sealants of this example after one and two weeks of curing at room temperature are shown in Table IV.

TABLE IV

| Property | Cured one week | | Cured two weeks | |
|---|---|---|---|---|
|  | A | B | A | B |
| Tensile strength (p.s.i.) | 310 | 110 | 370 | 140 |
| Modulus at 100% (p.s.i.) | 75 | 25 | 80 | 30 |
| Modulus at 200% (p.s.i.) | 110 | 35 | 120 | 45 |
| Modulus at 300% (p.s.i.) | 140 | 45 | 160 | 60 |
| Elongation (percent) | 740 | 680 | 780 | 600 |
| Hardness (Shore A) | 35 | 14 | 36 | 15 |

It is of course to be understood that the foregoing examples are intended to be illustrative of specific embodiments only and that numerous changes can be made in the ingredients, proportions and conditions specifically set forth therein without departing from the scope of the invention as defined in the appended claims.

I claim:
1. A polysulfide-polyurethane air-curable sealant and coating composition comprising a prepolymer of the structure

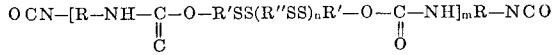

wherein R is a member selected from the group consisting of arylene and alkylene radicals, R' and R'' are the same members selected from the group consisting of aliphatic hydrocarbon and aliphatic ether radicals having up to 26 carbon atoms and up to 11 etheric oxygen atoms in the chain thereof and being carbon terminated, $n$ has an integral value of 1 to 100 and $m$ has an integral value of 2 to 15, and an inert filler.

2. A polysulfide-polyurethane air-curable sealant and coating composition comprising a prepolymer of the structure

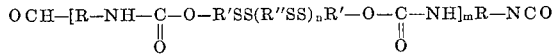

wherein R is a member selected from the group consisting of arylene and alkylene radicals, R' and R'' are the same members selected from the group consisting of aliphatic hydrocarbon and aliphatic ether radicals having up to 26 carbon atoms and up to 11 etheric oxygen atoms in the chain thereof and being carbon terminated, $n$ has an integral value of 1 to 100 and $m$ has an integral value of 2 to 15, and at least one inert material selected from the group consisting of fillers, plasticizers and internal lubricants.

3. A composition according to claim 2 and wherein said inert material is a filler used in an amount of about 15 to 300 parts by weight per 100 parts of said prepolymer.

4. A composition according to claim 2 and wherein said inert material is a plasticizer used in an amount of up to 200 parts by weight per 100 parts of said prepolymer.

5. A composition according to claim 2 and wherein said inert material is an internal lubricant used in an amount of up to 5 parts by weight per 100 parts of said prepolymer.

6. A polysulfide-polyurethane air-curable sealant and coating composition comprising, in parts by weight: 100 parts of a prepolymer of the structure

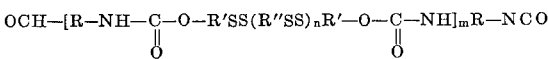

wherein R is a member selected from the group consisting of arylene and alkylene radicals, R' and R'' are the same members selected from the group consisting of

wherein $y$ has an integral value of from 1 to about 10,

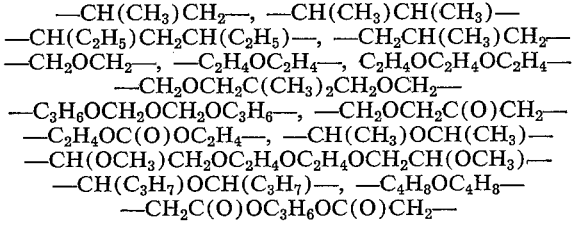

—$C_2H_4C(O)O(C_2H_4O)_yC(O)C_2H_4$—, wherein $y$ has an integral value of from 1 to about 10,

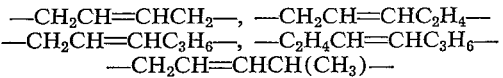

and —$C_2H_4CH=CHCH_2CH(CH_3)$—, $n$ has an integral value of 1 to 100 and $m$ has an integral value of 2 to 15; 15 to 300 parts of a filler; up to 200 parts of a plasticizer; and up to 5 parts of an internal lubricant.

7. A polysulfide-polyurethane air-curable sealant and coating composition comprising a prepolymer of the structure

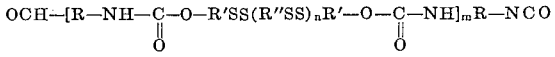

wherein R is a tolyl radical, R' and R'' are the same members selected from the group consisting of

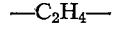

—$C_2H_4OC_2H_4$— and —$C_2H_4OCH_2OC_2H_4$— radicals, $n$ has an integral value of 1 to 100 and $m$ has an integral value of 2 to 15, and an inert filler.

8. A composition according to claim 7 and wherein R' and R'' are each the —$C_2H_4$— radical.

9. A method of making a one-package storage-stable air-curable sealant and coating composition which comprises reacting (a) a polysulfide polymer of the structure

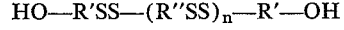

and a molecular weight of between about 500 and 9000 wherein R' and R'' are the same members selected from the group consisting of aliphatic hydrocarbon and aliphatic ether radicals having up to 26 carbon atoms and up to 11 etheric oxygen atoms in the chain thereof and being carbon terminated, and $n$ has an integral value of 1 to 100, and (b) a polyisocyanate having the formula

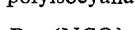

wherein R is a member selected from the group consisting of arylene and alkylene radicals and $x$ has an integral value of at least 2, said polysulfide polymer and polyisocyanate being reacted in amounts such that the ratio of isocyanate groups to hydroxyl groups is greater than 1.0 and less than 2.0, and admixing the resulting polysulfide-polyurethane prepolymer with an inert material selected from the group consisting of fillers, plasticizers and internal lubricants.

10. A composition according to claim 9 and wherein said polysulfide polymer and said polyisocyanate are reacted in amounts such that the ratio of isocyanate groups to hydroxyl groups is in the range of about 1.25 to 1.75.

11. A method of making a one-package storage-stable air-curable sealant and coating composition which comprises reacting (a) a polysulfide polymer of the structure $$HO-R'SS-(R''SS)_n-R'-OH$$

and a molecular weight of between about 500 to 9000 wherein R' and R'' are the same members selected from the group consisting of $-(CH_2)_y-$, wherein $y$ has an integral value of from 1 to about 10, $-CH(CH_3)CH_2-$, $$-CH(CH_3)CH(CH_3)-$$

$-CH(C_2H_5)CH_2CH(C_2H_5)-$, $-CH_2CH(CH_3)CH_2-$, $$-CH_2OCH_2-, -C_2H_4OC_2H_4-$$
$$-C_2H_4OC_2H_4OC_2H_4-$$
$$-CH_2OCH_2C(CH_3)_2CH_2OCH_2-$$

$-C_3H_6OCH_2OCH_2OC_3H_6-$, $-CH_2OCH_2C(O)CH_2-$, $-C_2H_4OC(O)OC_2H_4, -CH(CH_3)OCH(CH_3)-$
$-CH(OCH_3)CH_2OC_2H_4OC_2H_4OCH_2CH(OCH_3)-$
$-CH(C_3H_7)OCH(C_3H_7)-, -C_4H_8OC_4H_8-$
$-CH_2C(O)OC_3H_6OC(O)CH_2-$ $-C_2H_4C(O)O(C_2H_4O)_yC(O)C_2H_5-$, wherein $y$ has an integral value of from 1 to about 10, $-CH_2CH=CHCH_2-$, $-CH_2CH=CHC_2H_4-$
$-CH_2CH=CHC_3H_6-$, $-C_2H_4CH=CHC_3H_6-$
$-CH_2CH=CHCH(CH_3)-$ and $-C_2H_4CH=CHCH_2CH(CH_3)-$, $n$ has an integral value of 1 to 100, and (b) a polyisocyanate having the formula $$R-(NCO)_x$$

wherein R is a member selected from the group consisting of arylene and alkylene radicals and $x$ has an integral value of at least 2, said polysulfide polymer and said polyisocyanate being reacted in amounts such that the ratio of isocyanate groups to hydroxyl groups is greater than 1.0 and less than 2.0 to form a polysulfide-polyurethane prepolymer, and admixing said polysulfide-polyurethane prepolymer with an inert filler.

12. A method of making a one-package storage-stable air-curable sealant and coating composition which comprises reacting (a) a polysulfide polymer of the structure $$HO-R'SS-(R''SS)_n-R'-OH$$

and a molecular weight of between about 500 to 9000 wherein R' and R'' are the same members selected from the group consisting of $-C_2H_4-$, $-C_2H_4OC_2H_4-$ and $-C_2H_4OCH_2OC_2H_4-$ radicals and $n$ has an integral value of 1 to 100, and (b) toluene diisocyanate, said polysulfide polymer and said diisocyanate being reacted in amounts such that the ratio of isocyanate groups of hydroxyl groups is greater than 1.0 and less than 2.0, and admixing 100 parts by weight of the resulting polysulfide-polyurethane reaction product with about 15 to 300 parts of a filler, up to about 200 parts of a plasticizer and up to about 5 parts of an internal lubricant.

13. A method according to claim 12 and wherein R' and R'' are the $-C_2H_4-$ radical.

14. A composition according to claim 1 and wherein R and R'' each have a total of 2 to 10 carbon and etheric oxygen atoms.

15. A method according to claim 11 and wherein R' and R'' each have a total of 2 to 10 carbon and etheric oxygen atoms.

References Cited

UNITED STATES PATENTS

| | | | |
|---|---|---|---|
| 3,077,464 | 2/1963 | Simon et al. | 260—77.5 |
| 3,169,119 | 2/1965 | Dankert et al. | 260—2.5 |

MORRIS LIEBMAN, Primary Examiner

L. T. JACOBS, Assistant Examiner

U.S. Cl. X.R.

260—31.8, 33.8, 37, 79.7

PO-1050
(5/69)

UNITED STATES PATENT OFFICE
CERTIFICATE OF CORRECTION

Patent No. 3,499,863        Dated March 10, 1970

Inventor(s) Edward F. Kutch

It is certified that error appears in the above-identified patent and that said Letters Patent are hereby corrected as shown below:

Col. 2, line 56, change $CH(C_2H_5)$ etc. to $-CH(C_2H_5)$ etc.; Col. 3, line 32, change suitable to suitably; Col. 7, line 54, change OCH- etc. to OCN- etc.; Col. 8, line 6, change OCH- etc. to OCN- etc.; Col. 8, line 38, change OCH- etc. to OCN- etc.; Col. 9, line 25, change etc. $(O)C_2H_5-$ to etc. $(O)C_2H_4-$.

SIGNED AND
SEALED
AUG 18 1970

(SEAL)
Attest:

Edward M. Fletcher, Jr.
Attesting Officer

WILLIAM E. SCHUYLER, JR.
Commissioner of Patents